United States Patent
Feulner

(10) Patent No.: US 10,774,788 B2
(45) Date of Patent: Sep. 15, 2020

(54) PARTICLE EXTRACTION SYSTEM FOR A GAS TURBINE ENGINE

(71) Applicant: United Technologies Corporation, Farmington, CT (US)

(72) Inventor: Matthew R. Feulner, West Hartford, MI (US)

(73) Assignee: Raytheon Technologies Corporation, Farmington, CT (US)

( * ) Notice: Subject to any disclaimer, the term of this patent is extended or adjusted under 35 U.S.C. 154(b) by 565 days.

(21) Appl. No.: 15/194,944

(22) Filed: Jun. 28, 2016

(65) Prior Publication Data

US 2017/0370326 A1  Dec. 28, 2017

(51) Int. Cl.
| | |
|---|---|
| F02C 7/052 | (2006.01) |
| F02K 3/06 | (2006.01) |
| F02C 3/045 | (2006.01) |
| F02C 6/08 | (2006.01) |

(52) U.S. Cl.
CPC ............... *F02K 3/06* (2013.01); *F02C 3/045* (2013.01); *F02C 7/052* (2013.01); *F02C 6/08* (2013.01); *F05D 2250/71* (2013.01)

(58) Field of Classification Search
CPC .... F02C 7/05; F02C 7/052; F02C 6/08; F02C 9/18; F02C 3/13; B64D 2033/022; B64D 2033/0246; F05D 2260/607; F05B 2260/63; F02K 3/06; F02K 3/02; F02K 3/025; F02K 3/04; F02K 3/075
See application file for complete search history.

(56) References Cited

U.S. PATENT DOCUMENTS

| | | | |
|---|---|---|---|
| 2,575,415 A | 11/1951 | Grimac | |
| 3,993,463 A | 11/1976 | Barr | |
| 4,702,071 A | 10/1987 | Jenkins et al. | |
| 7,249,929 B2 | 7/2007 | Cummings et al. | |
| 8,430,202 B1* | 4/2013 | Mason | F01D 17/105 181/210 |
| 8,452,516 B1 | 5/2013 | Rose et al. | |
| 8,539,748 B2 | 9/2013 | Petrowicz et al. | |
| 8,550,208 B1* | 10/2013 | Potokar | F02K 3/075 181/212 |
| 10,400,670 B2* | 9/2019 | Kiszewski | F01D 9/041 |
| 2006/0277919 A1* | 12/2006 | Martensson | F02C 3/13 60/785 |

(Continued)

FOREIGN PATENT DOCUMENTS

| | | |
|---|---|---|
| EP | 1898068 | 3/2008 |
| WO | 2011045373 | 4/2011 |

OTHER PUBLICATIONS

The Extended European Search Report for EP Application No. 17178501.7, dated Nov. 6, 2017.

*Primary Examiner* — William H Rodriguez
(74) *Attorney, Agent, or Firm* — Carlson, Gaskey & Olds, P.C.

(57) ABSTRACT

A gas turbine engine includes an engine core includes at least one compressor, a combustor downstream of the compressor, and at least one turbine downstream of the combustor. A primary flowpath fluidly connects each of the compressor, the combustor, and the turbine. At least one particle extraction duct has an extraction duct inlet connected to the primary flowpath fore of the compressor and an extraction duct outlet connected to a bypass flowpath.

15 Claims, 2 Drawing Sheets

(56) References Cited

U.S. PATENT DOCUMENTS

| | | | |
|---|---|---|---|
| 2007/0261410 A1* | 11/2007 | Frank | F01D 17/105 60/785 |
| 2010/0162682 A1* | 7/2010 | Lerg | B01D 45/06 60/226.1 |
| 2012/0070271 A1 | 3/2012 | Urban et al. | |
| 2013/0052004 A1* | 2/2013 | Stilin | F01D 9/042 415/211.2 |
| 2013/0098047 A1* | 4/2013 | Suciu | F02C 7/08 60/772 |
| 2013/0187007 A1* | 7/2013 | Mackin | F02C 6/08 244/134 R |
| 2013/0239584 A1* | 9/2013 | Suciu | F01D 15/08 60/792 |
| 2014/0000279 A1* | 1/2014 | Brousseau | B64D 13/08 60/782 |
| 2014/0109589 A1* | 4/2014 | Pritchard, Jr. | F02K 3/075 60/779 |
| 2014/0119891 A1* | 5/2014 | Schmittenberg | B64D 33/02 415/121.2 |
| 2014/0245747 A1* | 9/2014 | Pritchard, Jr. | F01D 17/105 60/782 |
| 2015/0040535 A1* | 2/2015 | Judd | F02C 7/05 60/39.092 |
| 2015/0159560 A1 | 6/2015 | Kumar et al. | |
| 2015/0330308 A1* | 11/2015 | Goupil | F01D 25/243 415/144 |
| 2016/0017804 A1* | 1/2016 | Afrianto | F02C 6/08 60/39.092 |
| 2016/0245180 A1* | 8/2016 | Todorovic | F02K 1/54 |
| 2017/0058783 A1* | 3/2017 | Tan | F02C 9/18 |
| 2017/0138263 A1* | 5/2017 | Duge | B01D 45/04 |
| 2017/0191503 A1* | 7/2017 | Pearson | B01D 45/16 |
| 2017/0284303 A1* | 10/2017 | Johnson | B64D 13/08 |
| 2017/0284304 A1* | 10/2017 | Nestico | F02C 3/13 |
| 2017/0363000 A1* | 12/2017 | Kiszewski | F01D 9/041 |
| 2018/0100440 A1* | 4/2018 | Moniz | F02C 6/08 |
| 2018/0100441 A1* | 4/2018 | Moniz | F02C 6/08 |
| 2019/0024587 A1* | 1/2019 | Smith, III | F02C 7/052 |
| 2019/0218971 A1* | 7/2019 | Niergarth | F02C 7/14 |

* cited by examiner

PARTICLE EXTRACTION SYSTEM FOR A GAS TURBINE ENGINE

TECHNICAL FIELD

The present disclosure relates generally to gas turbine engines, and more specifically to a gas turbine engine including a particle extraction system.

BACKGROUND

Gas turbine engines include a compressor that ingests and compresses air, a combustor where the compressed air is mixed with a fuel and ignited, and a turbine section across which the combustion products are expanded. The expansion of the combustion products drives the turbine section to rotate, thereby driving rotation of a fan, and a corresponding portion of the compressor. The compressor, combustor, and turbine sections are connected to each other via a primary fluid flowpath beginning at an inlet forward of the compressor, and terminating at an outlet aft of the turbine.

In some examples, such as extreme weather conditions, bird strikes, or any other movement through a debris field, it is possible for debris to pass through the fan and be ingested into the primary flowpath through the inlet. If allowed to pass through the primary flowpath, this debris can damage rotors, stators, and/or other gaspath components within the primary flowpath.

SUMMARY OF THE INVENTION

In one exemplary embodiment a gas turbine engine includes an engine core including at least one compressor, a combustor downstream of the compressor, and at least one turbine downstream of the combustor, a primary flowpath fluidly connecting each of the compressor, the combustor, and the turbine, and at least one particle extraction duct having an extraction duct inlet connected to the primary flowpath fore of the compressor and an extraction duct outlet connected to a bypass flowpath.

In a further example of the above described gas turbine engine the at least one particle extraction duct is a plurality of particle extraction ducts arranged circumferentially about an engine centerline.

In a further example of any of the above described gas turbine engines the particle extraction ducts are evenly circumferentially spaced.

In a further example of any of the above described gas turbine engines the extraction duct outlet is downstream of at least one of a fan exit guide vane and a bifurcation strut, relative to an expected fluid flow through a fan duct.

In a further example of any of the above described gas turbine engines the extraction duct inlet includes a lip at least partially intersecting an expected debris path.

In a further example of any of the above described gas turbine engines the expected debris path follows a contour of an outer diameter of the primary flowpath.

In a further example of any of the above described gas turbine engines the lip extends radially inward beyond an outer diameter of the primary flowpath.

In a further example of any of the above described gas turbine engines a primary flowpath inlet is oversized relative to an expected needed air volume of the engine core.

In a further example of any of the above described gas turbine engines the primary flowpath inlet is oversized by a volume approximately equal to a volume of air extracted by the at least one particle extraction duct.

In a further example of any of the above described gas turbine engines the primary flowpath includes an outer diameter radius change in excess of 20% of a span of a core inlet guide vane from the primary flowpath inlet to a compressor inlet.

An exemplary method for removing debris from a gas turbine engine includes providing a particle extraction duct including an inlet connected to the fore of a compressor section and an outlet connected to a fan duct, passing debris from an expected debris path through the inlet and through the outlet, and expelling the debris out an aft end of the fan duct.

In a further example of the above described exemplary method for removing debris from a gas turbine engine passing debris from the expected debris path through the inlet comprises intersecting the expected debris path with a lip positioned on an aft edge of the particle extraction duct.

In a further example of any of the above described exemplary methods for removing debris from a gas turbine engine passing debris through the outlet comprises expelling debris from the particle extraction duct into the fan duct downstream of at least one of a fan exit guide vane and a bifurcation strut.

In a further example of any of the above described exemplary methods for removing debris from a gas turbine engine passing debris through the outlet comprises expelling debris from the particle extraction duct into the fan duct downstream of a fan exit guide vane.

In one exemplary embodiment a gas turbine engine includes a core including a primary flowpath, the primary flowpath having a steep radially inward turn upstream of a compressor inlet and downstream of a primary flowpath inlet, and a particle extraction duct connecting a radially outward surface of the primary flowpath to a fan duct, an inlet of the particle extraction duct being positioned at a base of the steep radially inward turn.

In another example of the above described gas turbine engine an outlet of the particle extraction duct is positioned downstream of a fan exit guide vane, relative to an expected direction of fluid flow through the fan duct.

In another example of any of the above described gas turbine engines the steep radially inward turn includes an inner diameter radius change in excess of 20% of a span of a core inlet guide vane from the primary flowpath inlet to a compressor inlet.

Another example of any of the above described gas turbine engines further includes an aft lip positioned at the inlet and intersecting an expected debris path.

These and other features of the present invention can be best understood from the following specification and drawings, the following of which is a brief description.

DETAILED DESCRIPTION OF AN EMBODIMENT

Figure 1:
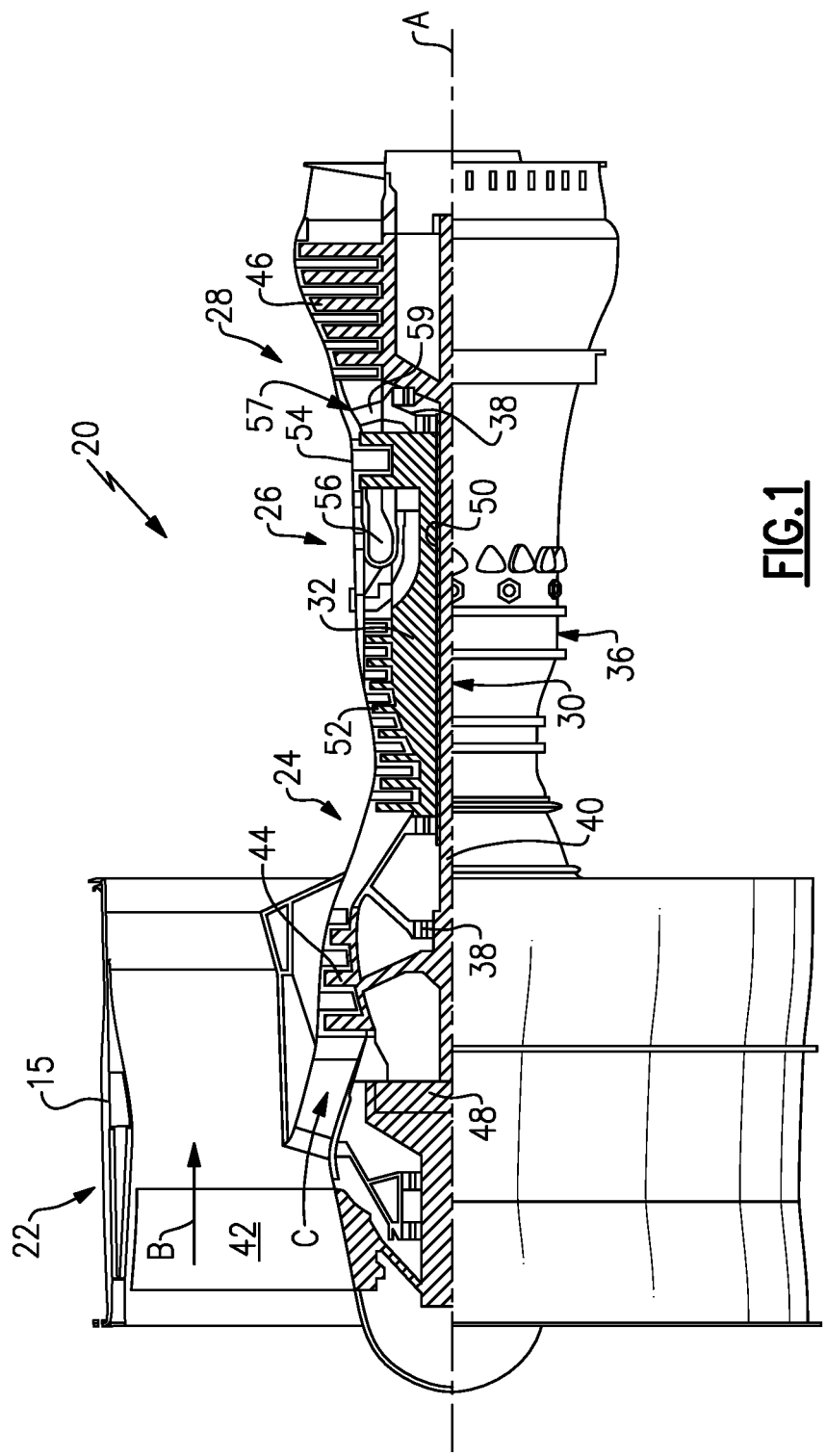
FIG. 1 schematically illustrates a gas turbine engine according to one example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10668 meters). The flight condition of 0.8 Mach and 35,000 ft (10668 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/s).

Figure 2:
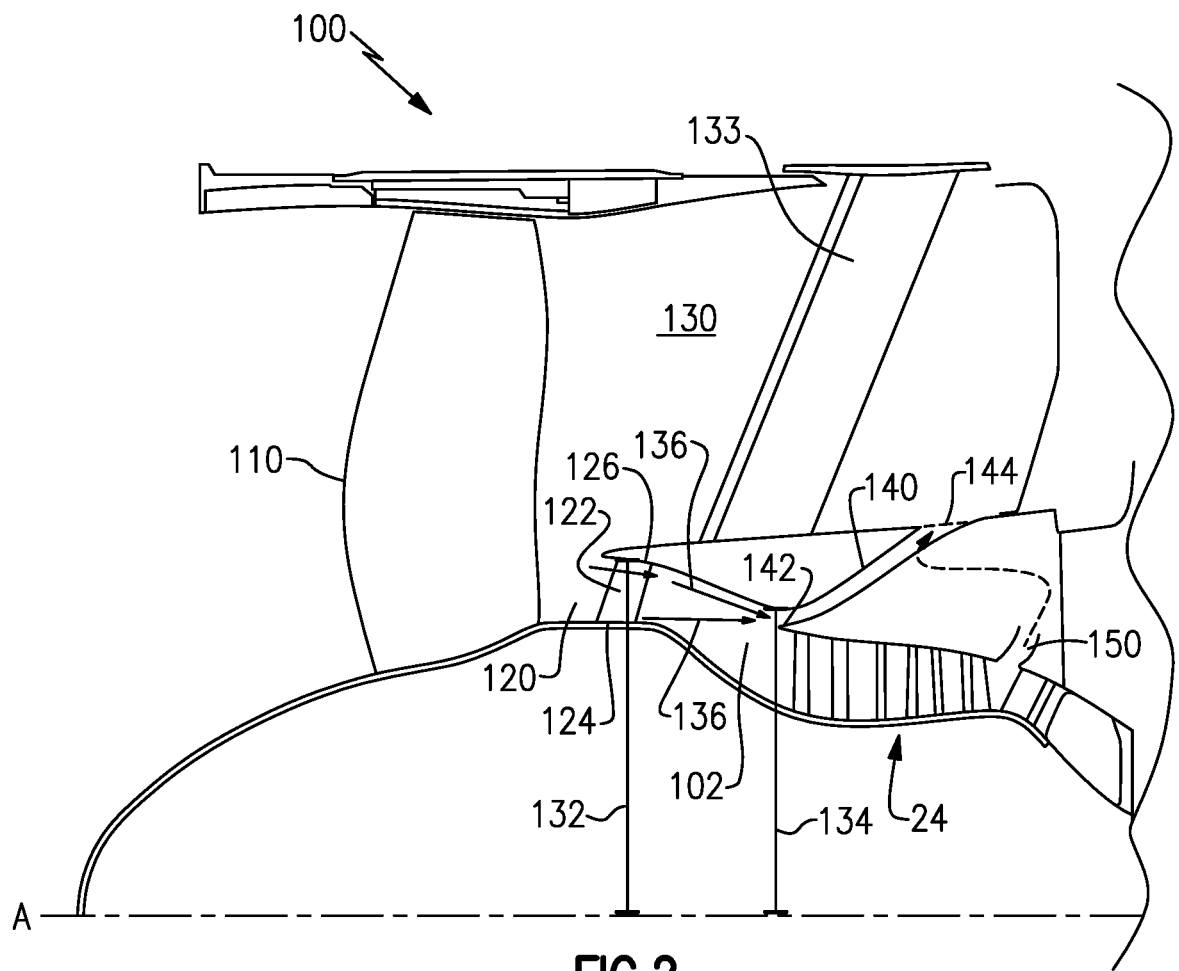
FIG. 2 schematically illustrates an example inlet portion of a gas turbine engine.

With continued reference to FIG. 1, FIG. 2 illustrates an inlet portion 100 of the exemplary gas turbine engine 20. The inlet portion 100 includes a fan 110 fore of a primary flowpath inlet 120 and a fan duct 130. The primary flowpath inlet 120 allows air into the compressor section 24. Immediately downstream of the inlet 120 are multiple guide vanes 122. Each guide vane 122 spans from a radially inner diameter 124 to a radially outer diameter 126 of the primary flowpath 102. Aft of the guide vane 122, the primary flow path 102 turns steeply radially inward towards an engine centerline axis A until the primary flowpath 102 reaches the initial stages of the compressor section 24.

In the example inlet portion 100, of FIG. 2, the radially inward turn of the primary flowpath 102 has a steep slope. In other words, the radially inward turn has a first outer diameter radius 132 at the inlet 120, and a second outer diameter radius 134 immediately before the compressor section 24, and the second outer diameter 134 is reduced from the first outer diameter radius 132 by an amount at least 20% of the span of the core inlet guide vane 122. As a result of the steep turn, debris passing through the fan 110 and entering the primary flowpath 102, is forced to an outer diameter 126 edge of the primary flowpath along a debris paths 136 due to the ballistic nature of the debris.

One or more particle extraction ducts 140 connect the outer diameter 126 of the primary flowpath 102 to the fan duct 130, and allow debris traveling along the debris paths 136 to pass from the primary flowpath into the fan duct 130, without entering the compressor section 24. In some examples, the particle extraction ducts 140 are arranged circumferentially about the primary flowpath 24, and are evenly spaced. In alternative examples, the particle extraction ducts 140 can be unevenly spaced, depending on the expected needs of a given gas turbine engine. In one exemplary engine, there are nine distinct particle extraction ducts 140 at the same axial position and spaced circumferentially about the engine centerline.

Figure 3:
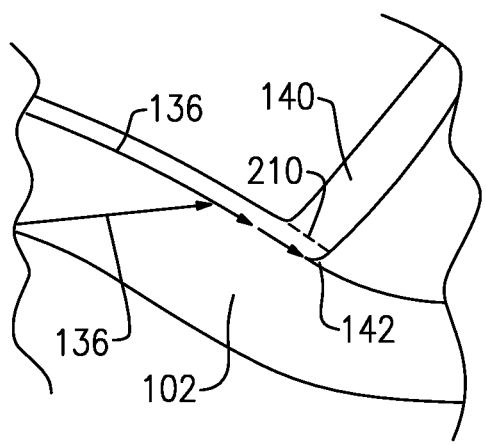
FIG. 3 schematically illustrates a lip portion of the example gas turbine engine of FIG. 2.

Included at an inlet of each particle extraction duct 140 is a lip 142 that intersects a corresponding debris path 136. In a typical example, the lip 142 intersecting with the debris path 136 is achieved by extending the lip 142 radially inward of the outer diameter of the primary flowpath 102. The lip 142 acts as a scoop and collects debris from the debris path 136, directing the debris into the particle extraction duct 140. Further detail with regards to the lip 142 is illustrated in FIG. 3, and is described below.

On an outlet end 144 of the particle extraction duct 140, the duct 140 connects to the fan duct 130 and expels collected air and debris into the fan duct 130. In the illustrated example, the outlet end 144 is aft of at least one of a fan exit guide vane 133 within the fan duct 130. By positioning the outlet end 144 aft of the fan exit guide vane 133, any debris that is expelled from the particle extraction duct 140 avoids impacting structural elements within the fan duct 130 and can be harmlessly expelled out the rear of the engine 20.

In order to minimize, or eliminate, any performance impact on the gas turbine engine 20, the inlet 120 of the primary flowpath is oversized relative to an amount of air needed to fully operate the engine 20. The oversize refers to a volume of air allowed to enter the inlet 122, and is matched with the volume of air that is removed from the primary flowpath 102 by the particle extraction ducts 140.

In the illustrated example engine, the compressor section 20 also includes an aft bleed 150 that removes air from the low pressure compressor prior to the air being passed to the high pressure compressor. The aft bleed 150 is ducted using any standard ducting means to one or more outlets at approximately the same axial position as the outlet 144 of the particle extraction duct 140, relative to the axis A of the engine 20. One of skill in the art, having the benefit of this disclosure, will understand that the aft bleed 150 can be located in any other, or additional, suitable location, and the illustrated example is non-limiting.

With continued reference to FIG. 2, and with like numerals indicating like elements, FIG. 3 schematically illustrates the inlet portion of a particle extraction duct 140. The lip 142 is positioned at an aft edge of the inlet to the particle extraction duct 140. The lip 142 extends into the primary flowpath 102 at least far enough to intersect with the debris path 136. The debris path 136 follows along the outer diameter edge of the primary flowpath. One of skill in the art, having the benefit of this disclosure, will recognize that the outer diameter of the primary flowpath 102 continues along the dashed line 210 at the inlet of the particle extraction duct 140. Thus, in addition to intersecting with the debris path 136, the lip 142 extends radially inward of the outer diameter of the primary flowpath 102.

By intersecting with the debris path 136, the lip 142 acts as a scoop and forces the debris path 136 to curve radially outward into the particle extraction duct 140. From there, the pressure of the air passing through the primary flowpath 102 and the particle extraction duct 140 forces the debris outward, and expels the debris.

While illustrated herein as being included within a two spooled geared turbofan engine 20, one of skill in the art, having the benefit of this disclosure, will understand that the particle extraction duct can be included within any gas turbine engine including a steep radially inward turn in the primary flowpath, with the particle extraction duct inlet being positioned at the bottom of the radially inward turn.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   an engine core including at least one compressor, a combustor downstream of the compressor, and at least one turbine downstream of the combustor;
   a primary flowpath fluidly connecting each of the compressor, the combustor, and the turbine;
   at least one particle extraction duct having an extraction duct inlet connected to said primary flowpath fore of all compressors in the engine core and an extraction duct outlet connected to a bypass flowpath; and
   wherein the primary flowpath includes an outer diameter radius change in excess of 20% of a span of a core inlet guide vane from a primary flowpath inlet to a compressor inlet.

2. The gas turbine engine of claim 1, wherein the at least one particle extraction duct is a plurality of particle extraction ducts arranged circumferentially about an engine centerline.

3. The gas turbine engine of claim 2, wherein the particle extraction ducts are evenly circumferentially spaced.

4. The gas turbine engine of claim 1, wherein the extraction duct outlet is downstream of a fan exit guide vane, relative to an expected fluid flow through a fan duct.

5. The gas turbine engine of claim 1, wherein the extraction duct inlet includes a lip at least partially intersecting an expected debris path.

6. The gas turbine engine of claim 5, wherein the expected debris path follows a contour of an outer diameter of the primary flowpath.

7. The gas turbine engine of claim 5, wherein the lip extends radially inward beyond an outer diameter of the primary flowpath.

8. The gas turbine engine of claim 1, wherein the primary flowpath inlet is oversized by a volume approximately equal to a volume of air extracted by said at least one particle extraction duct.

9. A method for removing debris from a gas turbine engine comprising:
   providing a particle extraction duct including an extraction duct inlet connected to a primary flowpath fore of all compressors in an engine core and an extraction duct outlet connected to a fan duct, wherein the primary flowpath includes an outer diameter radius change in excess of 20% of a span of a core inlet guide vane from a primary flowpath inlet to a compressor inlet of a portion of the engine core housing a first compressor and a second compressor;
   passing debris from an expected debris path through said extraction duct inlet and through said extraction duct outlet; and
   expelling the debris out an aft end of the fan duct.

10. The method of claim 9, wherein passing debris from the expected debris path through said inlet comprises intersecting the expected debris path with a lip positioned on an aft edge of the particle extraction duct.

11. The method of claim 9, wherein passing debris through said outlet comprises expelling debris from the particle extraction duct into the fan duct downstream of a fan exit guide vane.

12. A gas turbine engine comprising:

a core including a primary flowpath, the primary flowpath having a radially inward turn upstream of all compressor inlets of the core and downstream of a primary flowpath inlet, the radially inward turn including an inner diameter radius change in excess of 20% of a span of a core inlet guide vane from the primary flowpath inlet to the compressor inlet; and a particle extraction duct connecting a radially outward surface of the primary flowpath to a fan duct, a particle extraction duct inlet being positioned at a base of the radially inward turn.

13. The gas turbine engine of claim 12, wherein an outlet of the particle extraction duct is positioned downstream of a fan exit guide vane, relative to an expected direction of fluid flow through the fan duct.

14. The gas turbine engine of claim 12, further comprising an aft lip positioned at the particle extraction duct inlet and intersecting an expected debris path.

15. A gas turbine engine comprising:

a fan upstream of an engine core;

the engine core being surrounded by a core nacelle and including at least one compressor, a combustor downstream of the compressor, and at least one turbine downstream of the combustor;

a primary flowpath fluidly connecting each of the compressor, the combustor, and the turbine; and at least one particle extraction duct having an extraction duct inlet connected to said primary flowpath fore of said compressor and an extraction duct outlet connected to a bypass flowpath, wherein the extraction duct inlet is disposed in the core nacelle upstream of all compressors in the engine core.

* * * * *